(12) United States Patent
Ellis et al.

(10) Patent No.: US 7,185,045 B2
(45) Date of Patent: Feb. 27, 2007

(54) ETHERNET INTERFACE DEVICE FOR REPORTING STATUS VIA COMMON INDUSTRIAL PROTOCOLS

(75) Inventors: David G. Ellis, Clifton Park, NY (US); Steven A. Schoenberg, Clifton Park, NY (US)

(73) Assignee: Sixnet, LLC, Clifton Park, NY (US)

( * ) Notice: Subject to any disclaimer, the term of this patent is extended or adjusted under 35 U.S.C. 154(b) by 822 days.

(21) Appl. No.: 10/195,915

(22) Filed: Jul. 15, 2002

(65) Prior Publication Data
US 2004/0010627 A1 Jan. 15, 2004

(51) Int. Cl.
*H04L 12/14* (2006.01)

(52) U.S. Cl. .................. 709/200; 709/227; 370/352; 379/209.01

(58) Field of Classification Search ................ 709/227, 709/228, 249, 224, 226, 200; 710/11; 455/426.1; 370/218, 238, 449, 450, 416, 417, 352, 360, 370/209.01
See application file for complete search history.

(56) References Cited

U.S. PATENT DOCUMENTS

| | | | |
|---|---|---|---|
| 5,127,090 A | 6/1992 | Ruehle et al. | |
| 5,151,978 A | 9/1992 | Bronikowski et al. | |
| 5,970,430 A | 10/1999 | Burns et al. | |
| 5,978,578 A | 11/1999 | Azarya et al. | |
| 5,978,850 A | 11/1999 | Ramachandran et al. | |
| 6,032,208 A | 2/2000 | Nixon et al. | |
| 6,169,928 B1 | 1/2001 | Olson et al. | |
| 6,192,281 B1 | 2/2001 | Brown et al. | |
| 6,233,626 B1 * | 5/2001 | Swales et al. | 710/11 |
| 6,260,073 B1 * | 7/2001 | Walker et al. | 709/249 |
| 6,360,277 B1 | 3/2002 | Ruckley et al. | |
| 6,389,480 B1 * | 5/2002 | Kotzur et al. | 709/249 |
| 6,418,324 B1 * | 7/2002 | Doviak et al. | 455/426.1 |
| 6,636,499 B1 * | 10/2003 | Dowling | 370/338 |
| 6,674,764 B1 * | 1/2004 | Garland et al. | 370/449 |
| 6,678,265 B1 * | 1/2004 | Kung et al. | 370/352 |
| 6,982,953 B1 * | 1/2006 | Swales | 370/218 |

* cited by examiner

*Primary Examiner*—Khanh Dinh
(74) *Attorney, Agent, or Firm*—Schmeiser, Olsen & Watts

(57) ABSTRACT

An Ethernet interface device, and associated system and method, for reporting the status information data of Ethernet devices through common industrial protocols. The Ethernet interface device provides operational connections between one or more Ethernet devices and one or more independent networks. The Ethernet interface device also monitors an Ethernet connection path, and produces status data indicative of the operational status of the connection path and the devices connected along the path. This status data is received by the Ethernet interface device, where it is manipulated into a format recognizable by common industrial protocols.

42 Claims, 4 Drawing Sheets

ETHERNET INTERFACE DEVICE FOR REPORTING STATUS VIA COMMON INDUSTRIAL PROTOCOLS

BACKGROUND OF THE INVENTION

1. Technical Field

The invention relates generally to a network interface device for Ethernet communications networks, and more particularly to an Ethernet interface device which is able to provide status information related to a connected network and associated devices connected to the network in a format recognizable by common industrial protocols.

2. Related Art

Local Ethernet devices are commonly connected to an Ethernet network using a device known as an Ethernet hub or Ethernet switch. Ethernet switches typically make the required connections with no regard to segregation or restriction of network traffic. There are significant limitations to the usefulness of using these types of devices to make connections to independent networks. These limitations include, inter alia, the fact that data containing information related to the operational status of devices connected along the Ethernet network typically cannot be delivered directly to those control devices which can effectively use the information. Rather, the data must be first translated or otherwise manipulated into a common industrial protocol (i.e., a non-Ethernet protocol) which the control device can recognize and utilize.

Accordingly, there exists a need for a simplified Ethernet interface device, which is capable of solving the above-mentioned limitations related to Ethernet switches for providing status information related to the connected network and associated network devices, where status information is in a format that is recognizable by common industrial protocols.

SUMMARY OF THE INVENTION

It is therefore a feature of the present invention to overcome the above shortcomings related to the transmission of operational status information by providing a method and apparatus for an Ethernet interface device, embodied in an Ethernet switch, which is able to interface Ethernet networks and Ethernet devices with common industrial protocols.

The invention disclosed herein is an Ethernet switch which is easily configured by a user possessing limited technical knowledge. The simplicity of this invention enhances reliability (through its simplicity), reduces installation time and skill level required, makes it practical to swap these devices when repairs are necessary, and makes it possible to view or control the flow of Ethernet traffic through commercially available industrial controllers and software.

The invention is built upon the observation that it is desirable for one or more Ethernet devices to communicate to each of two or more independent networks through "uplink" ports, and that status information, related to the connected network and the associated devices connected to the network, would be most useful if the status information could be recognizable by common industrial protocols used in known communications network equipment.

In a first general aspect, the present invention provides a network switch for use in a communications network, wherein said network switch comprises: at least one network port for communicating information with one or more network devices; at least one device port; at least one Ethernet switch operatively coupled to said network port and to said device port, wherein said Ethernet switch couples said network port to said device port; an apparatus for communication between said Ethernet switch and at least one local Ethernet device via said at least one device port; and a central processing unit, wherein said central processing unit includes: polling apparatus for testing the operational status of communication between said Ethernet switch and said at least one local Ethernet device, wherein said polling apparatus produces a status result determined by the testing; and recording apparatus for recording the status result.

In a second general aspect, the present invention provides a method of providing status information in a communications network, said method comprising: providing a network switch comprising: at least one network port for communicating information with one or more network devices; at least one device port; providing at least one Ethernet switch operatively coupled to said network port and to said device port, wherein said Ethernet switch couples said network port to said device port; providing an apparatus for communication between said Ethernet switch and at least one local Ethernet device via said at least one device port; and providing a central processing unit, wherein said central processing unit includes: polling apparatus for testing the operational status of communication between said Ethernet switch and said at least one local Ethernet device, wherein said polling apparatus produces a status result determined by the testing; and recording apparatus for recording the status result.

In a third general aspect, the present invention provides a computer program product, comprising: a computer usable medium having a computer readable program code stored therein for causing an Ethernet communication path failure to be detected, the computer readable program code in said computer program product comprising: computer readable program code means for causing a computer to detect failures in at least one Ethernet communication path; computer readable program code means for causing a computer to effect changes in contents of a register containing status information pertinent to the status of said Ethernet communication path; and computer readable program code means for causing said contents of a register to be readable by a standard industrial protocol, wherein said standard industrial protocol is an industrial protocol.

The foregoing and other features and advantages of the invention will be apparent from the following more particular description of embodiments of the invention. It is to be understood that both the foregoing general description and the following detailed description are exemplary, but are not restrictive, of the invention.

BRIEF DESCRIPTION OF THE DRAWINGS

The features and inventive aspects of the present invention will become more apparent upon reading the following detailed description, claims and drawings, of which the following is a brief description.

DETAILED DESCRIPTION OF THE EMBODIMENTS

The following is a detailed explanation of a structure and method for an Ethernet switch which is able to interface between a variety of Ethernet devices connected to the Ethernet, and control or supervisory devices which operate with common industrial protocols. The term "protocol" as used herein, is defined as a set of formal rules which describe how to transmit data, especially across a network. It should be noted that the same reference numbers are assigned to components having approximately the same functions and structural features in the following explanation and the attached drawings to preclude the necessity for repeated explanation thereof.

Figure 1:
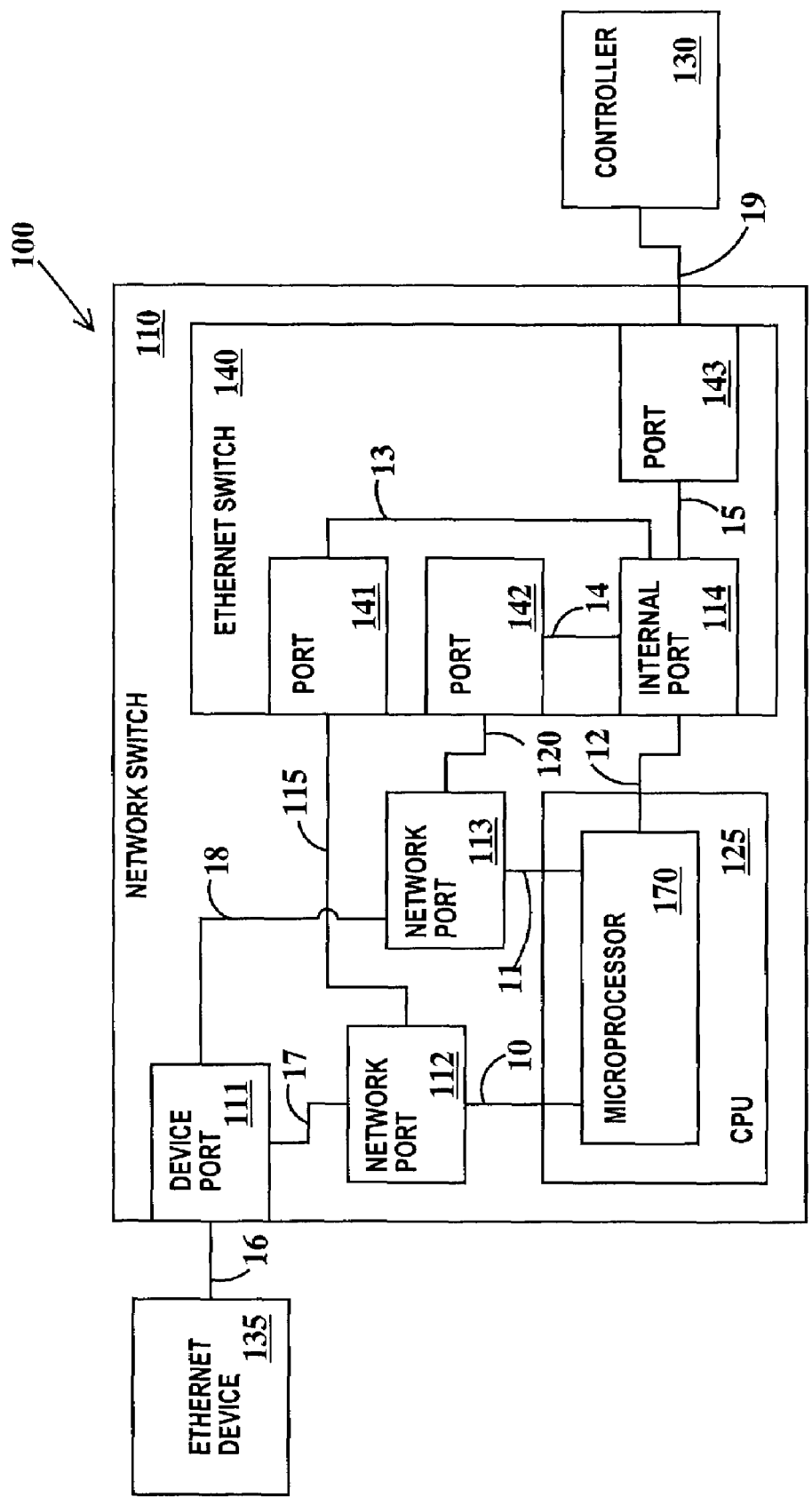
FIG. 1 is a schematic view of a communication network including an Ethernet device switch in accordance with an embodiment of the present invention.

According to a general illustrative embodiment of the present invention, shown schematically in FIG. 1, the illustrative system 100 described herein includes an Ethernet switch 140 which will function as one element in a larger network (not shown), for example, an Ethernet network. An Ethernet network, as discussed herein, is a local area network wherein data is broken into packets and transmitted within a network which network contains switch apparatus capable of rerouting the transmitted data. Each packet is transmitted, and arrives at its destination without colliding with any other packet. The first contention slot after a transmission is reserved for an acknowledge packet. A node is either transmitting or receiving at any instant. Moreover, the Ethernet networks discussed herein are characterized by certain unique Ethernet characteristics known to those skilled in the art, namely the use of an Ethernet frame structure; an unreliable and connectionless service to a network layer; baseband transmission with Manchester encoding; and use of a Carrier Sense Multiple Access with Collision Detection (CSMA/CD) multiple access algorithm. An Ethernet network will be discussed as relating to the illustrative embodiment for convenience sake, but this discussion is not meant to be limited to Ethernet networks only, nor to any particular type of network.

The Ethernet switches disclosed and claimed herein are as used in Ethernet systems by persons of ordinary skill in the art. The known Ethernet switches include, inter alia, two characteristics which are particularly relevant. First, MAC-based ports with I/O data frame buffers effectively isolate the port from data traffic being sent at the same time to or from other ports on the Ethernet switch. Second, multiple internal data paths allow data frames to be transferred between different ports at the same time. Because each port provides access to a high-speed network bridge (i.e., the switch), the collision domain in the network is reduced to a series of small domains in which the number of participants is reduced to two, namely the switch port and the connected Network Interface Card (NIC).

The first illustrative system 100 utilizes a feature which may be found in network switches, especially Ethernet switches. This feature is referred to as a Virtual Local Area Network (VLAN). Utilizing the VLAN feature permits restriction of communications traffic to only selected communication ports, so that the communications traffic can be restricted, for example, to authorized groups of users or to specific devices.

Referring to FIG. 1, a network switch 110 is shown which includes an Ethernet switch 140. Ethernet switch 140 may be an integral part of network switch 110, or may be located outside network switch 110 while remaining operatively connected to network switch 110. Network switch 110 may further include a central processing unit (CPU) 125 which itself includes microprocessor 170. CPU 125 may be either an integral part of network switch 110, or may be located outside network switch 110 while remaining operatively connected to network switch 110. For the purposes of this discussion, CPU 125 and microprocessor 170 will be considered to be an integral part of network switch 110, so that microprocessor 170 may be considered an embedded microprocessor.

The network switch 110 represents an apparatus for communication between the Ethernet switch and at least one local Ethernet device 135, via device port 111 and, for example, circuit paths 115, 17, and 16, or directly via circuit path 20.

The embedded microprocessor 170 within this network switch 110 may further be a dedicated microprocessor, or it may be part of the core circuitry found in an existing module, such as, for example, a SIXNET EtherTRAK I/O module (i.e., part number ET-16DI2-H). The core circuitry of this SIXNET module includes an embedded microprocessor (such as, inter alia, an Atmel Mega103 microprocessor). Network switch 110 may also include one or more device ports 111 for connection to an external local device(s) 135, via circuit path 16; one or more network ports 112, 113 (such as, inter alia, an Ethernet port) respectively connected to device port 111 through circuit paths 17 and 18, as well as other components (e.g., a power supply) needed to make the embedded microprocessor 170 function properly. Program software and data are stored in memory coupled to the embedded microprocessor 170. Henceforth, this embedded microprocessor 170 and its related peripheral circuitry will be referred to as the Central Processing Unit (CPU) 125. Hence, the network switch 110 comprises the CPU 125, and the CPU 125 comprises the embedded microprocessor 170. The embedded microprocessor 170 communicates with network ports 112 and 113 via circuit paths 10 and 11, respectively.

The embedded microprocessor 170 is programmed for this application, and is operatively connected through circuit paths 10 and 11 to the first and second network (i.e., uplink) ports 112, 113, respectively, of the network switch 110. Embedded microprocessor 170 is also operatively connected internally to the first, second and third device ports (i.e., local ports) 141, 142, 143, respectively, of the Ethernet switch 140 via an internal port 114 through circuit path 12. The internal port 114 is operatively connected to the first, second and third device ports 141, 142, 143 through circuit paths 13, 14 and 15, respectively. Local devices 135 connected through circuit path 16 to the device port(s) 111, include, inter alia, input and/or output devices, switches, transducers, etc., represented in FIG. 1 by device 135. A controller 130 is connected to Ethernet switch 140 via third device port 143 and circuit path 19. Controller 130 may be an external computer, an operator display device, or the like, and for the purposes of this discussion, controller 130 operates with software characterized by an industrial protocol, that is a nonEthernet protocol.

The embedded microprocessor 170 is assigned an Internet Protocol (IP) address so that the embedded microprocessor 170 can be addressed from means external to the network switch 110. Network configuration information, such as, inter alia, a configuration table, is loaded into the embedded microprocessor 170 with the appropriate connection rules, the rules including the primary and an optional secondary or alternate connection for each communication path 115, 120 between Ethernet switch ports 141, 142 and network ports 112, 113, as well as the IP or Media Access Control (MAC) addresses of devices 135 that are to be monitored. The use of both the IP and the MAC addresses allows both IP (e.g., TCP/IP (Transmission Control Protocol over Internet Protocol) or UDP/IP (User Datagram Protocol)) and other Ethernet protocols to be implemented.

A configuration table of Ethernet connections, for the Ethernet switch 140 to test, is loaded into the CPU 125 from an external program (i.e., a configuration program) used to configure the Ethernet switch 140. This configuration program may be an adaptation of an existing configuration tool, such as, inter alia, the SIXNET I/O Tool Kit software, which is a commercially available software package used for this purpose. The configuration table of Ethernet connections may be configurable by a user, and may include the IP address of the Ethernet device 135 which is to be periodically polled; the location of the Ethernet device135 on either a device port 111 or a specified network port 112, 113; and the I/O register number in the CPU 125 of the status register which is to contain the results of the test to be performed. Additionally, the configuration table may include a number representing how many "retries" or test repetitions should be performed, and the timing of the tests (i.e., how frequently a test should be performed.

The status register contains information related to the status of components of the Ethernet system. Status, as used herein, is defined as an indication that a device is operating as expected, that the device is operating, but in an unexpected manner, or that the device has failed. The device may be an Ethernet device, an Ethernet node which is a component of the Ethernet device, or a portion of the Ethernet that connects two or more Ethernet devices. The status of a device may be represented in binary form, that is, failed or not failed. Alternatively, the status of a device may be represented by an arbitrary graded sequence, such as from zero to ten, with zero representing a failed device, and ten representing a normally functioning device.

Referring again to FIG. 1, a test message (such as, inter alia, a Packet InterNet Groper (PING)) is periodically sent to each device 135 listed on a configuration table. The configuration table includes identification characteristics for various devices or elements connected to the Ethernet. If any device (i.e., a local device 135 connected to the Ethernet) fails to respond, a status bit is set accordingly in the embedded microprocessor 170.

A function included in the Ethernet switch 140 is to report the status of the Ethernet switch 140, and optionally, to allow the Ethernet switch 140 to have its configuration altered (i.e., assigned a new IP or MAC address), using standard internet protocols, such as, inter alia, Modbus or SIXNET Universal protocol, or other protocol similar to the Institute of Electrical and Electronics Engineers, Inc. standard IEEE 802.3 which defines the hardware and transport layers of variants of the Ethernet.

For example, a first Ethernet switch 140 can respond to polling (i.e., request-response interactions) commands which send a test message (i.e., a "ping" as discussed infra) issued by the CPU 125 of a second Ethernet switch in order to check the status of an input line, sensor, or memory location to see if a particular external event has been registered. The result received by the CPU 125 from the test message is placed in a status register in the CPU 125. The contents of the status register can then be read from commercially available control and monitoring equipment, such as, inter alia, programmable logic controllers (PLC), Supervisory Control And Data Acquisition (SCADA) software (i.e., operator interface software), or other common devices known in industry.

The CPU 125 in this network switch 110 may be configured (i.e., assigned a new IP or MAC address) from an external computer or other operator interface including an Ethernet configuration tool, through an Ethernet connection from any network port 112, 113 on the network switch 110. Initialization of the CPU 125 itself, including the establishment of an IP address for the CPU 125, is accomplished in the manner usually employed to talk to an Ethernet module, such as, inter alia, an EtherTRAK I/O module, which is a commercially available device, well documented in its user manual. When the operational status (i.e., whether the device or connection is operating or has failed) of specific network connections is determined, through the means described infra, the resulting status flags will be stored in discrete input or output (I/O) registers in the CPU 125. These I/O registers may replace the I/O registers that were ordinarily assigned to discrete physical input connections found on a typical I/O module, for example, inputs from discrete input or output devices (e.g., switches, valves, etc.). From the viewpoint of communicating with the I/O module from an external source, these I/O registers appear to be the standard discrete inputs on the I/O module. Moreover, three noteworthy differences exist between the known use of I/O registers to store status information related to discrete (non-Ethernet) input or out devices, and using the same I/O registers to store information related to operational status of Ethernet connections and Ethernet devices. The first is that this "I/O register" will be reporting the status of pre-defined network connections, instead of the state of an input signal which represents a physical embodiment, such as a closed switch or an open valve. Second, the common limitation of reporting 16 status bits, due to the typical number (i.e., 16) of input connections on a standard I/O module, does not exist in this case. This number of status bits that may be reported, for the purposes of an illustrative embodiment herein, will remain at 16, since this is an abundant number of status bits to report connection status on eight ports (i.e., port is good or port is failed). However, this number of status bits can be changed to any desired number, internal memory permitting, in a commercial embodiment. The third difference is that additional programming need be added to the CPU 125 to accomplish the functionality described below.

The CPU 125 will periodically send a TCP/IP Internet Control Message Protocol (ICMP) Echo messages (i.e., a "ping") to a specified list of devices (i.e., other network switches, ethernet switches, or local devices) and set the corresponding status flag, in an I/O register in the CPU 125, to, for example, TRUE if the operational status of the connection is functional (i.e., a reply is received) and FALSE if it is not. The CPU 125 includes instructions which characterize the polling information, including the type of test message to be used for testing the status of devices and circuit paths on said Ethernet; a retry number corresponding to the number of times a test message shall be sent before a failure is confirmed; and a timing number corresponding to the number of times a test message is sent within a specific time period.

Other protocols, such as IEEE 802.2 LLC (Logical Link Control), could also be used, so long as they provide a way to send a test message to elicit a response to determine the status. The Ethernet MAC and/or other appropriate address would be specified instead of the IP address when such a protocol is used.

Figure 3:
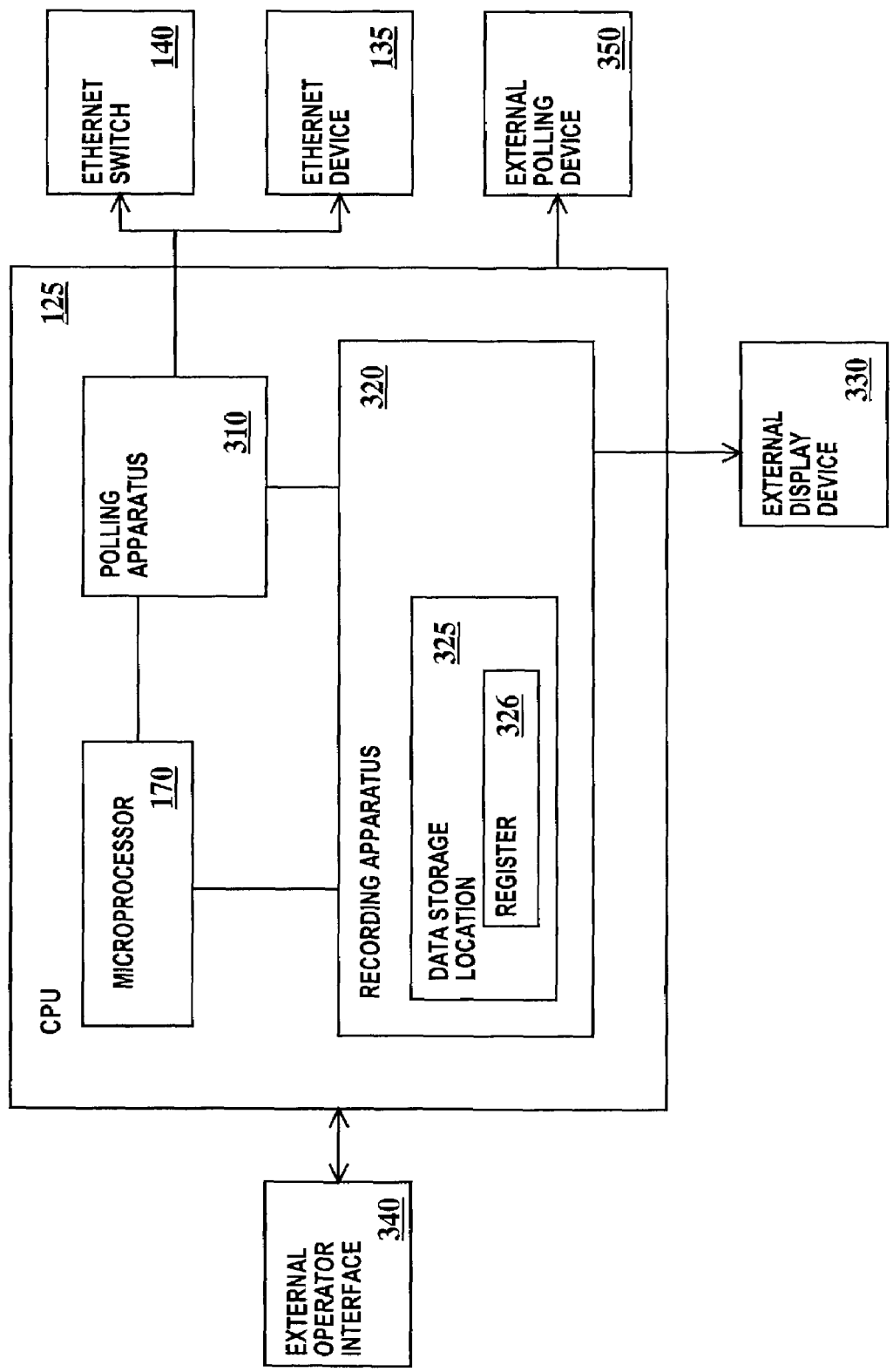
FIG. 3 is a schematic view of a central processing unit of a network switch in accordance with an embodiment of the present invention.

Referring to FIG. 3, the CPU 125 can include polling apparatus 310 which can monitor or poll communication between the Ethernet switch 140 and Ethernet device 135. The polling apparatus may be any known apparatus capable of sending a test message or polling a network, and receiving a response to the test message. The results of the polling conducted by polling apparatus 310 are stored in I/O registers in data storage location 325 by recording apparatus 320 (e.g., register writing apparatus) in CPU 125. The data storage location 325, for the purposes of this discussion, is an I/O register 326. However, the data storage location 325 may also be a memory or other storage media. Data storage location 325 may itself be read by an external device, such as external display device 330, using software compatible with known industrial communication protocols. The external device may be, inter alia, a monitor, a computer, or the like. Similarly, external operator interface 340 may be, inter alia, a monitor, a computer, or the like.

The CPU 125 can itself be polled by an external polling device 350. The external polling device may be another CPU (not shown) on a second network switch (not shown). Alternatively, the external polling device may be some other Ethernet device which has polling capabilities, and which is connected to the same Ethernet as CPU 125. The CPU 125 may report the status of these registers using, for example, either or both of a SIXNET Universal protocol and/or a Modbus protocol. Both of these protocols are commercially available and are standard industrial protocols in common usage. This polling function is a standard function of the ET-16DI2 I/O module on which the CPU 125 of this network switch 110 is based.

The status of network switch 110 may be monitored by external polling device 350 which polls CPU 125 itself through any port (i.e., the network ports 112, 113, the Ethernet ports 141, 142, 143, and possibly other ports such as serial ports) on the network switch 110 to determine the status of each of the test connections by reading the I/O registers in the CPU 125.

Figure 2:
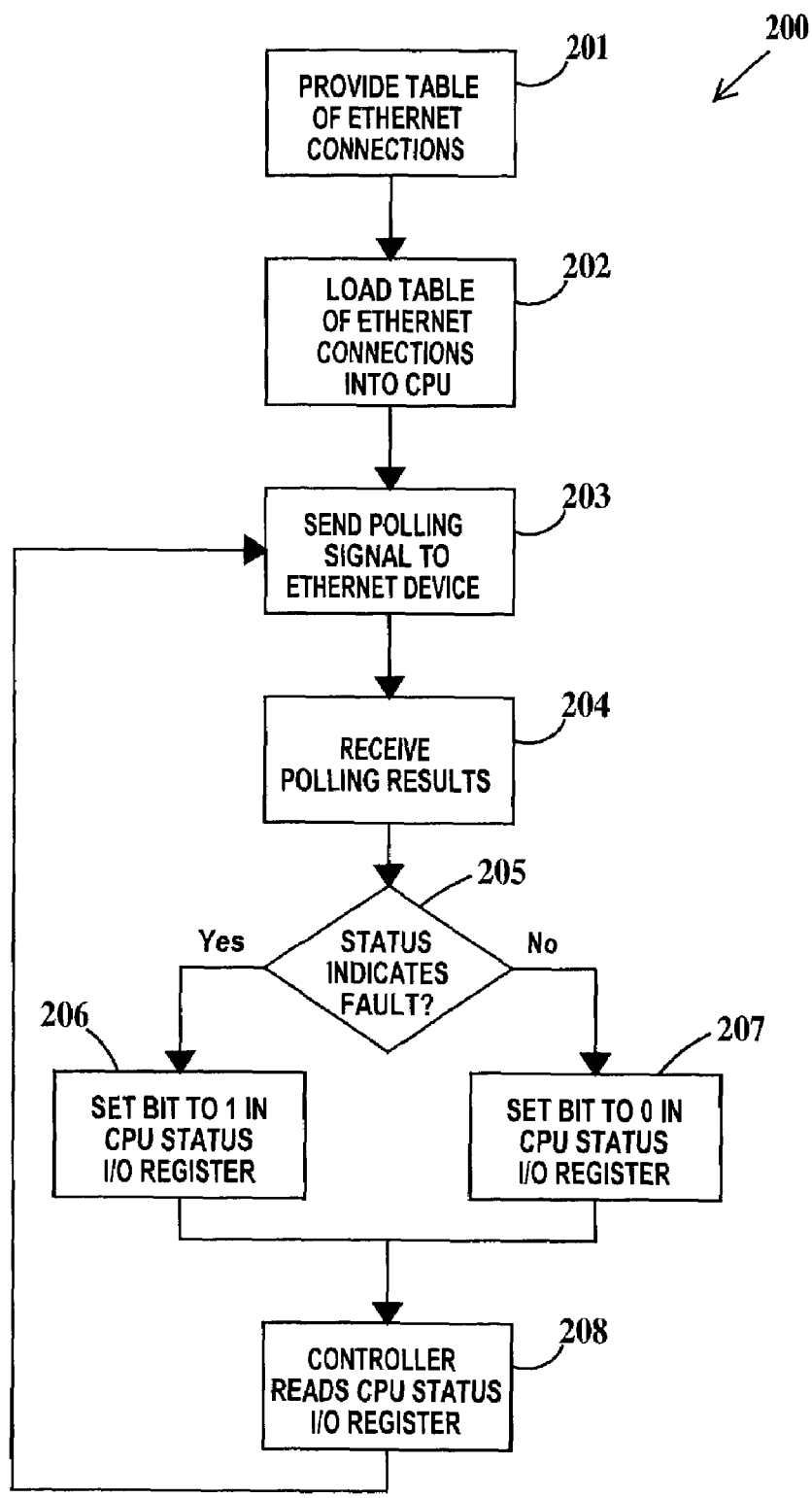
FIG. 2 is a flowchart representing the status reporting method in accordance with an embodiment of the present invention.

The status reporting method 200 is illustrated by the flowchart of FIG. 2. The status reporting method 200 begins with a preliminary step 201 in which a configuration table of Ethernet connections is provided from an external source. In the next step 202, the Ethernet configuration table is loaded into CPU 125 to configure the Ethernet switch 140 in accordance with the connections in the configuration table. Next, in step 203, a polling signal (i.e., a ping) is sent from the CPU 125 to the particular Ethernet devices which is to be polled. The polling results are received back in the CPU 125 in step 204. The polling results are evaluated in step 205 by CPU 125 to determine whether or not a fault has been has been detected. If a reply has been successfully received, step 205 determines that no fault exists, and process flow continues to step 207 where an I/O register bit in the CPU125 is set to, for example, a logical 0. On the other hand, if a reply is not successfully received, step 205 determines that a fault does exist, and process flow continues to step 206 where a status I/0 register bit in the CPU125 is set to a logical 1. Following either of steps 206 or step 207, step 208 is performed wherein two actions may occur. First, another pass of steps 203 to 208 is started. Also, the contents of the status I/O register in the CPU 125 can be read by the controller 130, thereby allowing the passing of the status information to other control systems operating with other protocols.

Figure 4:
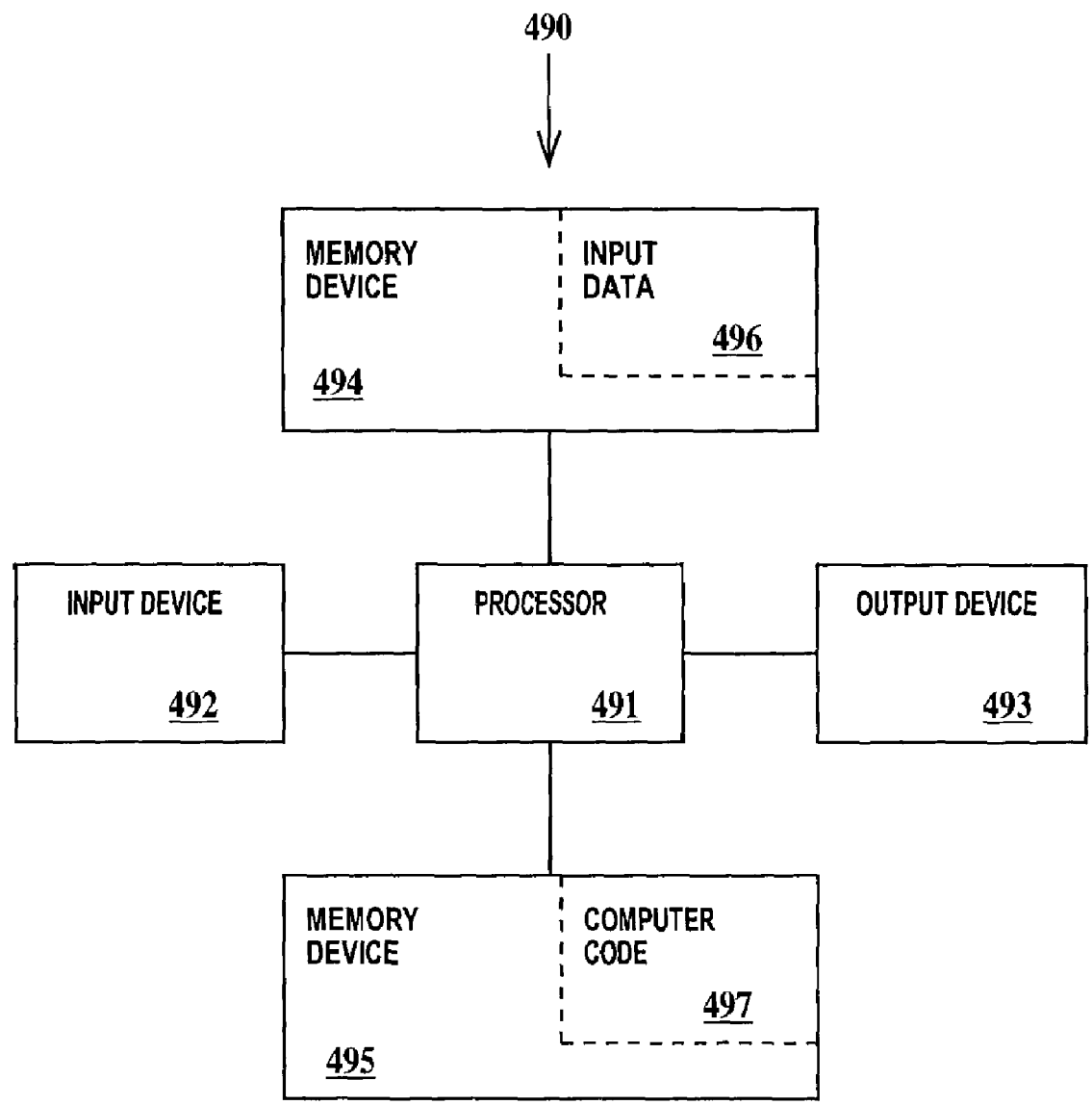
FIG. 4 is a schematic view of a computer system in accordance with an embodiment of the present invention.

FIG. 4 illustrates a computer system 490 for reporting status information between an Ethernet switch and a device operating to an industrial protocol, in accordance with embodiments of the present invention. The computer system 490 comprises a processor 491, an input device 492 coupled to the processor 491, an output device 493 coupled to the processor 491, and memory devices 494 and 495 each coupled to the processor 491. The input device 492 may be, inter alia, a keyboard, a mouse, etc. The output device 493 may be, inter alia, a printer, a plotter, a computer screen, a magnetic tape, a removable hard disk, a floppy disk, etc. The memory devices 494 and 495 may be, inter alia, a hard disk, a dynamic random access memory (DRAM), a read-only memory (ROM), etc. The memory device 495 includes a computer code 497. The computer code 497 includes an algorithm for recording the status of devices connected to the Ethernet switch 140 (FIG. 1). The processor 491 executes the computer code 497. The memory device 494 includes input data 496. The input data 496 includes input required by the computer code 497. The output device 493 displays output from the computer code 497. Either or both memory devices 494 and 495 (or one or more additional memory devices not shown in FIG. 4) may be used as a computer usable medium having a computer readable program code embodied therein, wherein the computer readable program code comprises the computer code 497.

While FIG. 4 shows the computer system 490 as a particular configuration of hardware and software, any configuration of hardware and software, as would be known to a person of ordinary skill in the art, may be utilized for the purposes stated supra in conjunction with the particular computer system 490 of FIG. 4. For example, the memory devices 494 and 495 may be portions of a single memory device rather than separate memory devices.

Thus, the data in the I/O registers, while representing the status of Ethernet devices, can be read by controllers or devices which incorporate other commercially available programmable logic controllers (PLC) software, Supervisory Control And Data Acquisition (SCADA) software (i.e., operator interface software), or other common software languages found in industry. This represents an advance over known standard practice which is to report the status from Ethernet switches or network switches using means such as Simple Network Management Protocol (SNMP) protocol, which is foreign to most industrial automation systems presently installed.

Embodiments of the present invention have been disclosed. A person of ordinary skill in the art would realize, however, that certain modifications would come within the teachings of this invention. Therefore, the following claims should be studied to determine the true scope and content of the invention.

What is claimed is:

1. A network switch for connecting an external Ethernet device to a computing device, wherein said network switch comprises:

an apparatus comprising a first device port electrically connected to a first network port through a first independent circuit path and a second network port through a second independent circuit path, wherein said first device port is adapted to electrically connect said external Ethernet device to said first network port and said second network port;

an Ethernet switch operatively coupled to said first network port through a first independent communication path and to said second network port through a second independent communication path, wherein said Ethernet switch couples said first network port and said second network port to said computing device;

a central processing unit directly connected to said first network port and said second network port, wherein said central processing unit comprises;
 a first internet protocol (IP) address assigned to said central processing unit, said first IP address for communicating with said central processing unit from an external operator interface;
 polling means internal to said central processing unit, wherein said polling means is for testing an operational status of communication between said Ethernet switch and said external Ethernet device, wherein said testing comprises transmitting and receiving an echo message between said polling means and said external Ethernet device, and wherein said polling means produces a status result determined by the testing;
 a recording apparatus internal to said central processing unit, wherein said recording apparatus is for recording the status result;
 an input/output register in said central processing unit, wherein said input/output register includes a status bit; and
 a configuration table, said configuration table adapted to configure said central processing unit, said configuration table including a second IP address of said external Ethernet device; an I/O register number; and a number representing frequency of testing the operational status, said I/O register number corresponding to said least one input/output register which includes said status bit;
 apparatus for setting said status bit in response to the status result; and
 apparatus for communicating said setting of said status bit to an external device via a standard protocol.

2. The network switch of claim 1, wherein said central processing unit further includes a microprocessor.

3. The network switch of claim 1, wherein said Ethernet switch operates in accordance with a standard Ethernet protocol.

4. The network switch of claim 1, wherein said external operator interface is adapted to alter said configuration table.

5. The network switch of claim 1, wherein said network switch includes at least one data storage location for receiving said status result.

6. The network switch of claim 5, wherein said data storage location is a register.

7. The network switch of claim 1, wherein said Ethernet switch has an address, said address recognizable by an Ethernet protocol.

8. The network switch of claim 1, wherein said echo message is a ping.

9. The network switch of claim 1, wherein said network switch further includes recording apparatus adapted to communicate said status result to an external device, said external device operating in accordance with an industrial protocol.

10. The network switch of claim 1, wherein said external Ethernet device comprises an input/output device selected from the group consisting of a switch and a transducer.

11. The network switch of claim 1, wherein said first communication path comprises a primary communication path for data flow between said external Ethernet device and said computing device, wherein said second communication path comprises an optional secondary communication path for data flow between said said external Ethernet device and said computing device, and wherein said central processing unit is adapted to switch between said first communication path and said second communication path based on said status result determined by the testing.

12. The network switch of claim 1, wherein said external Ethernet device comprises an IP address and a Media Access Control (MAC) address.

13. The Network switch of claim 1, wherein said Ethernet switch comprises a second device port, a third device port, a fourth device port, and an internal port, wherein said second device port is directly connected to said first network port through a third independent circuit path and to said internal port through a fourth independent circuit path, wherein said third device port is directly connected to said second network port through a fifth independent circuit path and to said internal port through a sixth independent circuit path, and wherein said internal port is directly connected to said fourth device port through a seventh independent circuit path.

14. The Network switch of claim 13, wherein said central processing unit further comprises a microprocessor, and wherein said internal port is directly connected to said microprocessor through an eighth independent circuit path.

15. The Network switch of claim 13, wherein said computing device is directly connected to said fourth device port through a eighth independent circuit path.

16. The Network switch of claim 1, wherein said central processing unit is directly connected to said first network port through a third independent circuit path, and wherein said central processing unit is directly connected to said second network port through a fourth independent circuit path.

17. The Network switch of claim 1, wherein said central processing unit further comprises a microprocessor, wherein said microprocessor is directly connected to said first network port through said third independent circuit path, and wherein said microprocessor is directly connected to said second network port through said fourth independent circuit path.

18. The Network switch of claim 1, wherein said first device port electrically connects said external Ethernet device to said first network port and to said second network port, wherein said external Ethernet device is connected to said computing device, and wherein said computing device is a controller.

19. The network switch of claim 1, wherein said polling means is directly connected to said microprocessor.

20. A method of providing status information in a communications network, said method comprising:
 providing a network switch comprising an apparatus, an Ethernet switch, a first apparatus, a second apparatus, and a central processing unit, wherein said network switch is for connecting an external Ethernet device to a computing device, wherein said apparatus comprises a device port electrically connected to a first network port through a first independent circuit path and a second network port through a second independent circuit path, wherein said device port electrically connects said external Ethernet device to said first network port and said second network port, wherein said Ethernet switch is operatively coupled to said first network port through a first independent communication path and to said second network port through a second independent communication path, wherein said Ethernet switch couples said first network port and said second network port to said computing device, wherein said central processing unit is directly connected to said first network port and said second network port, wherein said central processing unit includes an input/ output register, a configuration table, polling means, and a recording apparatus, wherein said polling means is internal to said central processing unit, wherein said recording apparatus is internal to said central processing unit, wherein said input/output register includes a status bit, wherein said configuration table comprises a first IP address of said external Ethernet device, an I/O register number corresponding to said input/output register which includes said status bit, and a number representing frequency of testing an operational status of communication between said Ethernet switch and said external Ethernet device;

assigning, said central processing unit a second IP address, said second IP address for communicating with said central processing unit from an external operator interface;

testing, by said polling means, an operational status of communication between said Ethernet switch and said external Ethernet device, wherein said testing comprises a transmitting and receiving, by said polling means, an echo message between said polling means and said external Ethernet device;

configuring, by said configuration table, said central processing unit;

producing, by said polling means, a status result determined by the testing;

recording by said recording apparatus the status result setting, by said first apparatus, said status bit in response to the status result; and communicating, by said second apparatus, said setting of said status bit to an external device via a standard protocol.

21. The method of claim 20, wherein said central processing unit further includes a microprocessor.

22. The method of claim 20, further comprising operating said Ethernet switch in accordance with a standard Ethernet protocol.

23. The method of claim 20, further comprising altering, by said external operator interface, said configuration table.

24. The method of claim 20, wherein said network switch includes at least one data storage location for receiving said status result.

25. The method of claim 24, wherein said data storage location is a register.

26. The network switch of claim 20, wherein said Ethernet switch includes an address, said address recognizable by an Ethernet protocol.

27. The method of claim 20, wherein said echo message is a ping.

28. The method of claim 20, wherein said network switch includes reporting apparatus, and wherein said method further comprises:

communicating, by said reporting apparatus, said status result to an external device, said external device operating in accordance with an industrial protocol.

29. The method of claim 20, wherein said external Ethernet device comprises an input/output device selected from the group consisting of a switch and a transducer.

30. The method of claim 13, wherein said first communication path comprises a primary communication path for data flow between said external Ethernet device and said computing device, wherein said second communication path comprises an optional secondary communication path for data flow between said external Ethernet device and said computing device, and wherein said method further comprises:

switching, by said central processing unit, between said first communication path and said second communication path based on said status result determined by the testing.

31. The method of claim 20, wherein said external Ethernet device comprises an IP address and a Media Access Control (MAC) address.

32. The method of claim 20, wherein said Ethernet switch comprises a second device port, a third device port, a fourth device port, and an internal port, wherein said second device port is directly connected to said first network port through a third independent circuit path and to said internal port through a fourth independent circuit path, wherein said third device port is directly connected to said second network port through a fifth independent circuit path and to said internal port through a sixth independent circuit path, and wherein said internal port is directly connected to said fourth device port through a seventh independent circuit path.

33. The method of claim 32, wherein said central processing unit further comprises a microprocessor, and wherein said internal port is directly connected to said microprocessor through a eighth independent circuit path.

34. The method of claim 32, wherein wherein said computing device is directly connected to said fourth device port through a eighth independent circuit path.

35. The method of claim 20, wherein wherein said central processing unit is directly connected to said first network port through a third independent circuit path, and wherein said central processing unit is directly connected to said second network port through a fourth independent circuit path.

36. The method of claim 20, wherein wherein said central processing unit further comprises a microprocessor, wherein said microprocessor is directly connected to said first network port through said third independent circuit path, and wherein said microprocessor is directly connected to said second network port through said fourth independent circuit path.

37. The method of claim 20, wherein wherein said first device port electrically connects said external Ethernet device to said first network port and to said second network port, wherein said external Ethernet device is connected to said computing device, and wherein said computing device is a controller.

38. The method of claim 20, wherein said polling means is directly connected to said microprocessor.

39. A computer program product, comprising a computer usable medium comprising a computer readable program code embodied therein, said computer readable program code adapted to implement a method for providing status information in a communications network and detecting an Ethernet communication path failure, said method comprising:

providing a network switch comprising an apparatus, an Ethernet switch, a first apparatus, a second apparatus, and a central processing unit, wherein said network switch is for connecting an external Ethernet device to a computing device, wherein said apparatus comprises a device port electrically connected to a first network port through a first independent circuit oath and a second network port through a second independent circuit path, wherein said device port electrically connects said external Ethernet device to said first network port and said second network port, wherein said Ethernet switch is operatively coupled to said first network port through a first independent communication path and to said second network port through a second independent communication path, wherein said Ethernet switch couples said first network port and said second network port to said computing device, wherein said central processing unit is directly connected to said first network port and said second network port, wherein said central processing unit includes an input/output register, a configuration table, polling means, and a recording apparatus, wherein said polling means is internal to said central processing unit, wherein said recording apparatus is internal to said central processing unit, wherein said input/output register includes a status bit, wherein said configuration table comprises a first IP address of said external Ethernet device, an I/O register number corresponding to said input/output register which includes said status bit, and a number representing frequency of testing an operational status of communication between said Ethernet switch and said external Ethernet device;

assigning, said central processing unit a second IP address, said second IP address for communicating with said central processing unit from an external operator interface;

testing, by said polling means, an operational status of communication between said Ethernet switch and said external Ethernet device, wherein said testing comprises a transmitting and receiving, by said polling means, an echo message between said polling means and said external Ethernet device;

configuring, by said configuration table, said central processing unit;

producing, by said polling means, a status result determined by the testing;

recording by said recording apparatus the status result setting, by said first apparatus, said status bit in response to the status result; and communicating, by said second apparatus, said setting of said status bit to an external device via a standard protocol.

40. The computer program product of claim 39, wherein the computer readable program code includes:

configuration information related to at least one Ethernet communications path, wherein said configuration information includes devices and pathways connected on said Ethernet communications path;

polling information for testing said Ethernet communications path to determine the status of said devices and pathways on said Ethernet communications path; and configuration information permitting reporting of status information between said CPU and a plurality of VLAN groups.

41. The computer program product of claim 40, wherein said polling information includes:

a test message for testing the status of said devices and circuit paths on said Ethernet communications path;

a retry number corresponding to the number of times a test message shall be sent before a failure is confirmed; and a timing number corresponding to the number of times a test message is sent within a specific time period.

42. The computer program product of claim 39, wherein said computer readable program code comprises instructions for causing contents of said input/output register to be readable by a standard industrial protocol, wherein said standard industrial protocol is an industrial protocol, and wherein said industrial protocol is chosen from the group consisting of: protocols for programmable logic controller software, protocols for Supervisory Control And Data Acquisition (SCADA) software, and protocols for operator interface software.

* * * * *

UNITED STATES PATENT AND TRADEMARK OFFICE
CERTIFICATE OF CORRECTION

PATENT NO. : 7,185,045 B2  Page 1 of 1
APPLICATION NO. : 10/195915
DATED : February 27, 2007
INVENTOR(S) : Ellis et al.

It is certified that error appears in the above-identified patent and that said Letters Patent is hereby corrected as shown below:

Column 12
Line 61, delete "oath" and insert -- path --

Signed and Sealed this

Twenty-ninth Day of May, 2007

JON W. DUDAS
*Director of the United States Patent and Trademark Office*